US007865867B2

(12) United States Patent
Keene Potter et al.

(10) Patent No.: US 7,865,867 B2
(45) Date of Patent: Jan. 4, 2011

(54) SYSTEM AND METHOD FOR MANAGING AND MONITORING MULTIPLE WORKFLOWS

(75) Inventors: Cathy Keene Potter, San Jose, CA (US); Yvonne Chau, San Jose, CA (US); Leonard Cheong, San Jose, CA (US); Rao Sadhureddy, San Jose, CA (US)

(73) Assignee: Agile Software Corporation, San Jose, CA (US)

( * ) Notice: Subject to any disclaimer, the term of this patent is extended or adjusted under 35 U.S.C. 154(b) by 828 days.

(21) Appl. No.: 10/321,104

(22) Filed: Dec. 16, 2002

(65) Prior Publication Data

US 2003/0181991 A1 Sep. 25, 2003

Related U.S. Application Data

(60) Provisional application No. 60/363,400, filed on Mar. 8, 2002.

(51) Int. Cl.
*G06F 9/44* (2006.01)
(52) U.S. Cl. ........................................ 717/101; 717/120
(58) Field of Classification Search .......... 717/101–105, 717/120–123
See application file for complete search history.

(56) References Cited

U.S. PATENT DOCUMENTS

| | | | |
|---|---|---|---|
| 4,887,206 A | 12/1989 | Natarajan | |
| 5,537,590 A | 7/1996 | Amado | |
| 5,701,400 A | 12/1997 | Amado | |
| 5,819,249 A | 10/1998 | Dohanich et al. | |
| 5,918,226 A * | 6/1999 | Tarumi et al. | 707/10 |
| 5,970,476 A | 10/1999 | Fahey | |
| 5,995,716 A | 11/1999 | Harrington et al. | |
| 6,289,354 B1 | 9/2001 | Aggarwal et al. | |
| 6,496,208 B1 | 12/2002 | Bernhardt et al. | |
| 6,601,234 B1 | 7/2003 | Bowman-Amuah | |
| 6,725,122 B2 | 4/2004 | Mori et al. | |
| 6,946,343 B2 * | 9/2005 | Liou | 438/241 |
| 7,020,701 B1 | 3/2006 | Gelvin et al. | |

(Continued)

OTHER PUBLICATIONS

Hollingsworth, "Workflow Management Coalition The Workflow Reference Model", Workflow Management Coalition WfMC, Hampshire, UK, pp. 1-55, 1995.*

(Continued)

*Primary Examiner*—Ted T Vo
(74) *Attorney, Agent, or Firm*—Townsend and Townsend and Crew LLP (57) ABSTRACT

A criteria-based system and method is provided for performing workload management. Unlike conventional systems, the invention provides a system and method that includes a core workload management entity for performing workload management for multiple process lines. Each process line is defined based on the criteria for a workload, such as a product line or service based task. The method may include providing initial information related to components supply, then developing workflow processes and workflow exit criteria algorithms for individual workflow steps. The exit criteria may produce a common thread among multiple product lines, allowing the process to extend to create a diverse master workflow system to manage and monitor the workflow of an organization. The system and method are adaptable to product supply chain workflow management, project management, service provision management, and any other scenario where some level of concurrent management of multiple workflows is desired.

12 Claims, 7 Drawing Sheets

U.S. PATENT DOCUMENTS

| | | |
|---|---|---|
| 7,130,807 B1 | 10/2006 | Mikurak |
| 7,310,624 B1 | 12/2007 | Aggarwal et al. |
| 7,353,467 B2 | 4/2008 | Robertson et al. |
| 7,395,193 B1 | 7/2008 | Yelich et al. |
| 7,610,286 B1 | 10/2009 | Yu et al. |
| 7,610,312 B1 | 10/2009 | Topolovac et al. |
| 2002/0023060 A1 | 2/2002 | Cooney et al. |
| 2002/0072986 A1 | 6/2002 | Aram |
| 2002/0091680 A1 | 7/2002 | Hatzis et al. |
| 2002/0116300 A1 | 8/2002 | DeBusk et al. |
| 2002/0152133 A1 | 10/2002 | King et al. |
| 2002/0174000 A1 | 11/2002 | Katz et al. |
| 2003/0028401 A1 | 2/2003 | Kaufman et al. |
| 2003/0074329 A1 | 4/2003 | Jandasek et al. |
| 2003/0172008 A1 | 9/2003 | Hage et al. |
| 2003/0172010 A1 | 9/2003 | Butani et al. |
| 2003/0187991 A1 | 10/2003 | Lin et al. |
| 2004/0139001 A1 | 7/2004 | Henriques et al. |
| 2005/0177435 A1 | 8/2005 | Lidow |

OTHER PUBLICATIONS

Marquina et al., "Integrating Autonomous Problem Resolution Models with Remedy", CERN, IT Divisional Reports Year 2000, pp. 1-5, Feb. 2000.*

WfMC, "Workflow Management Coalition Terminology & Glossary", Feb. 1999, Workflow Management Coalition, pp. 1-65.*

Hamadou Zourmba, "Automating Management tasks within a distributed Network Computing Environment", 2000, A thesis, Berlin University, Berlin Germany, pp. i-ix, 1-79.*

Ferreira et al., "A Workflow Management System for Coordinating Distributed Information-Based Business Processes", 1999, AAAI Technical Report WS-99-02, pp. 1-7.*

* cited by examiner

SYSTEM AND METHOD FOR MANAGING AND MONITORING MULTIPLE WORKFLOWS

CROSS-REFERENCES TO RELATED APPLICATIONS

The present application is a non-provisional of and claims the benefit and priority under 35 U.S.C. 119(e) of U.S. Provisional Application Ser. No. 60/363,400, filed on Mar. 8, 2002, and entitled, "SYSTEM AND METHOD FOR MANAGING AND MONITORING WORKFLOW", the contents of which is hereby incorporated by reference.

BACKGROUND

The invention generally relates to managing workflow, and, more particularly, relates to a system and method for managing and monitoring multiple workflows which may be distributed among multiple product lines, managed projects and services, and may occur concurrently in time or according to task sequences.

Many workflow applications exist that are directed to single and focused workflow monitoring and management scenarios. In conventional systems, individual workloads are managed independently from other workloads. For example, if a company produces multiple product lines, each product line is governed and managed by a separate workload management system. The system can usually handle quality control privileges, different types of change orders, and other supply chain related matters. Typically, each product line is managed separately, where each product line requires that a new workload management system be configured. Moreover, since each product line is separate, each product line needs to be monitored separately, increasing management tasks.

With the trend toward globalization and outsourcing of parts and components, companies require complex workflow organization. Diverse and similar product lines further complicate matters. Systems for managing workflow are well known in the industry, but few are robust enough to handle the complexity of modern product lines. For example, many original equipment manufacturers (OEMs) outsource components from its suppliers, allowing them to bid on and supply and supply different components and assemblies. Many complex relationships result from different business structures, which are difficult to manage and monitor in the organization of product assembly. To complicate matters further, markets, product designs and services change, and other business factors vary over time. It is important for a business to try to monitor the dynamic word flows that are instituted in such complicated scenarios, as well as the impacts of such changes on the workflow of a business.

Therefore, it would be useful to provide a method and system configured to easily manage and monitor workflows for products, project management and services. As will be evident by the description below, the invention accomplishes this in an elegant manner.

BRIEF SUMMARY OF THE INVENTION

The invention relates, in an embodiment, to a workflow administration system configured to manage a plurality of workflow processes, the system configured with a workflow administration module. The workflow administration system includes a criteria property module configured to define the requirements of process stages that are common to a plurality of workflows according to an exit criteria algorithm, wherein the algorithm is configured to consolidate the plurality of workflow steps. The workflow administration system also includes a progression module configured to define a common thread among the plurality of work flow processes to enable changes to occur stages that are common to different workflows.

DETAILED DESCRIPTION

The invention provides a criteria based system and method for performing workload management. Unlike conventional systems, the invention provides a system and method that includes a core workload management entity for performing workload management for multiple process lines. Each process line is defined based on the criteria for a workload, such as a product line or service based task. The invention relates to a system and method for managing and monitoring workflow processes. The invention will be described in the context of processes having steps or stages of development, whether it is for a product, service or project. Steps may pertain to a set of actions or measures relevant to the workflow, and may include sub-steps within any one step. Stages may include a level, degree or period of time that pertains to a process, and may include sub-stages as defined by a process. These terms may or may not be used interchangeably, depending on the process in questions. The method may include providing initial information related to components supply, then developing workflow processes and workflow exit criteria algorithms for individual workflow steps. The exit criteria may produce a common thread among multiple product lines, allowing the process to extend to create a diverse master workflow system to manage and monitor the workflow of an organization. The system is adaptable to product supply chain workflow management, project management, service provision management, and any other scenario where some level of concurrent management of multiple workflows is desired.

Multiple workflows may be developed having different steps, where each step has exit criteria that may be unique or common to other steps among the workflows. The invention integrates steps having common criteria. With respect to products, such criteria may be associated with a single product or its components, and may be represented among multiple workflows. For example, a product may be divided up into multiple components for its manufacture. These components may be produced in multiple locations, and even by different manufactures and suppliers. Each component may be developed and produced according to its own workflow, but may have exit criteria that are common to the steps of other components. Examples of such steps are procurement, common design approvals, color scenarios. The invention provides a means to manage these multiple workflows without the need to develop and manage separate workflows for each component according to the criteria associated with any given step. Employing a system according to the invention, steps may be consolidated and the system of respective workflows can be made more efficient. Some workflow steps can even be eliminated if steps of multiple workflows can be integrated in to fewer workflows.

The multiple exit criteria may then be governed by one or more decision criteria that govern whether the process may pass to subsequent process stages or steps. In one embodiment, if any affected item satisfies any one of the multiple exit criteria, the process proceeds to the next step. In another embodiment, if and only if all affected items satisfy all of the multiple exit criteria, the process proceeds to the next step. In another example, if and only if all affected items satisfy at least one of the multiple exit criteria, the process proceeds to the next step. Other decision criteria may be established depending on the business organization or process. If the process criteria are not met, the process does not proceed to the next step, and an error occurs, and the errors may be handled in a number of ways. Affected users may then be notified. This can occur automatically, and in a number of ways, such as email notices to affected people or other types of alerts.

Alternatively, the procession to a subsequent step may require approval from a primary qualified user. In a preferred embodiment, change analysts are established to manage and govern any changes to stages or steps in a workflow. Such analysts may be managerial or other qualified persons. Alternate qualified users may also be established in the event that the primary qualified user is not available. In one embodiment, one or more change analysts may be designated for managing changes made in particular workflow stages or steps. If the changes are to be made from a local administration level, a local change analyst may be designated for managing changes within a local workflow.

Similarly, a global change analyst may be designated for managing changes to be made at a global administration level. A global change analyst may be assigned to manage changes to workflows. The global analyst's duties may be automated by a global administration module, which then would be responsible for authorized changes to be made among multiple workflows. As a result, workflows steps existing in different workflows may be consolidated by the workflow administration module into single steps for administration purposes. Steps or stages under the control of a global change analyst are designated as such according to criteria that are identified as attributes to a particular step or stage of a process.

In one embodiment, steps or stages are identified as objects in a database, wherein the steps or stages have criteria attached as attributes that can be identified in a database search. Similarly, a component part may be established as an object in a database, identified by criteria attributes that can also be searched. Accordingly, any of these entities may be searched out and identified by their respective criteria. A global change analyst has the authority perform database searches according to these criteria attributes to make global changes to multiple workflows. Once identified, a global administration module may change these objects. The global change analyst according to its authority may preset these.

At either level, the change analyst is authorized to determine exit criteria, entry criteria, process steps to follow previous steps are stages, and other administrative decisions required to be made within a workflow or among the a plurality of workflows.

According to the invention, any workflow criteria may also be modified by other qualified users that are delegated authority according to a primary qualified user. These users may be established according to predetermined criteria, such as management ranking, availability, or other criteria. The qualification of users may also be established by a master user, such as a local or global analyst, and may be shared among users. This sharing may be established according to predetermined criteria, or may be configured according to a master user or other qualified user.

Whether the changes to stages are made at a local administration level of a workflow or a global administration level, the authority to make changes may be preset. The actions may occur automatically in response to certain criteria being met. For example, once the exit criteria of a stage are met, the process may automatically proceed to a predetermined subsequent step. Different scenarios may be set according to a particular business application. Also, actions may occur upon approval from qualified approvers. The approvers may very for different exit criteria, as well as for different stages in a process. A business may produce an actual physical product, such as a computer made up of various component parts and systems, a food product made up of ingredients, elements and compounds, a pharmaceutical product such as drugs made up of elements, compounds and chemicals according to predetermined recipes, or other products that involved outsourced items or components. Business processes may include business oriented operations such as shipping, procurement, purchasing, and other operations. Project management may include management of business plan development, architecting a building, process plant or other structure, or other projects. The invention provides a means for monitoring and managing the workflow of components, whether it is a manufactured product or a service based business, or some other type of project management.

For managing and monitoring workflows associated with services or project management, individual services or tasks can be considered components for purposes of an embodiment of the invention, where the components are quantified according to their individual cost, and monitored and managed much like component parts for manufactured products. The units of measurement associated with such components could be hours, days and weeks. And, workflow criteria can be associated with each measure. This makes the cost analysis similar to a manufactured product. The tasks and services may be broken down into their basic sub-tasks and sub-services, quantified, and categorized for workflow monitoring and management purposes.

Figure 1:
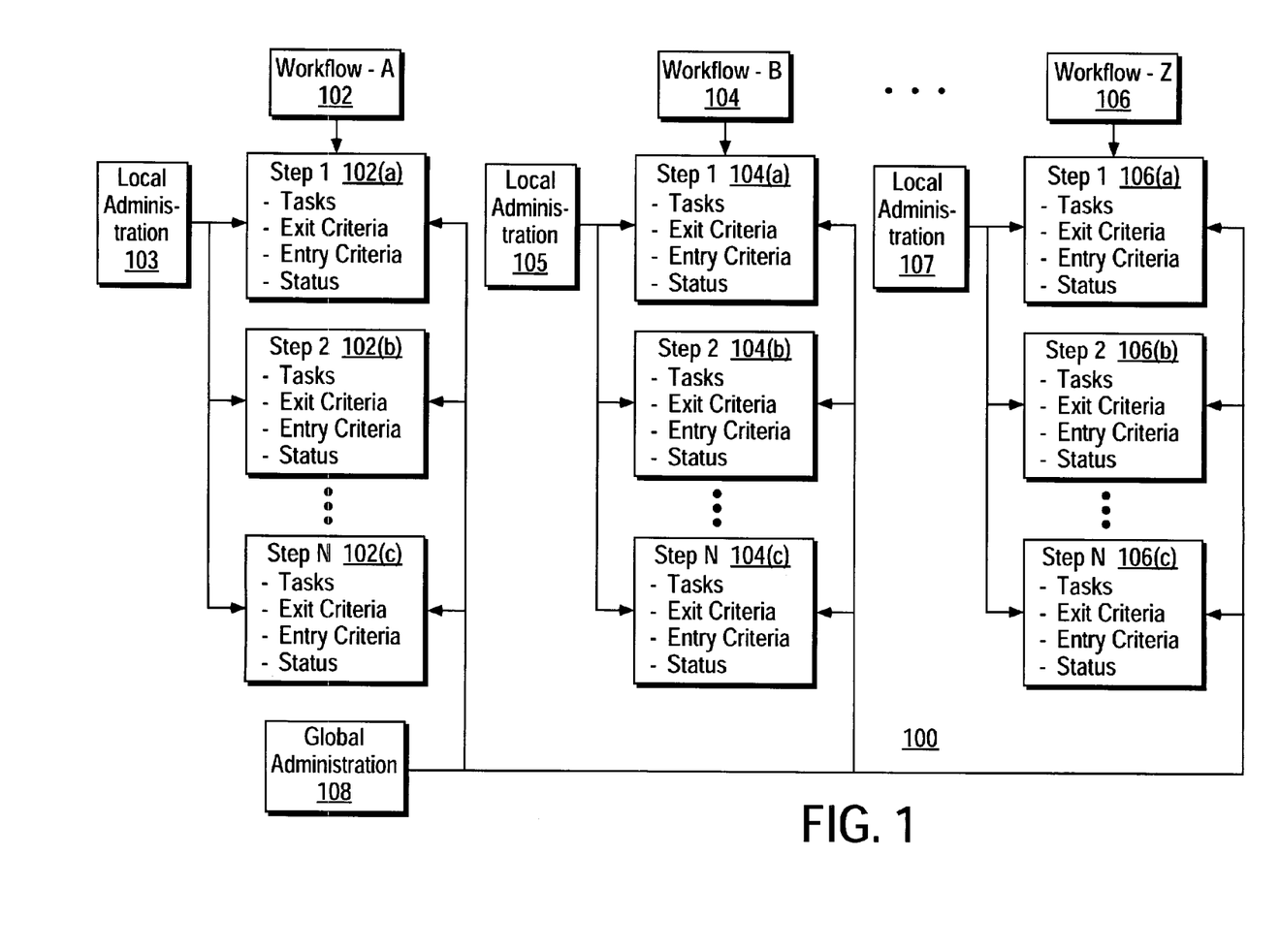
FIG. 1 is a diagrammatic view of a workflow system according to the invention.

Referring to FIG. 1, an embodiment of the system for managing workflow is illustrated. The system 100 illustrated is indicative of practical implementations where multiple workflows having multiple steps are utilized. Such a system may include workflow A 102, workflow B 104 and a virtually endless number of workflows possibly up to workflow Z. These workflows may be used to control workflows of multiple product lines, service functions and other types of processes where workflow needs to be managed. Workflow A, for example, includes multiple steps 102(*a*), 102(*b*) and 102(*c*), which each carry their own tasks, entry criteria, exit criteria, and status information. A local administration module 103 communicates with each of the steps of workflow A in order to administer of the workflow at a local level. Similarly, workflow B includes steps 104(*a*), 104(*b*) and 104(*c*); workflow C includes steps 106(*a*), 106(*b*) and 106(*c*); where each step of the separate workflows carry their own tasks, entry criteria, exit criteria, and status information. Local administration modules 105, 107 communicate with each of the steps of their respective workflows in order to administer the workflow at their local levels.

Figure 2A:
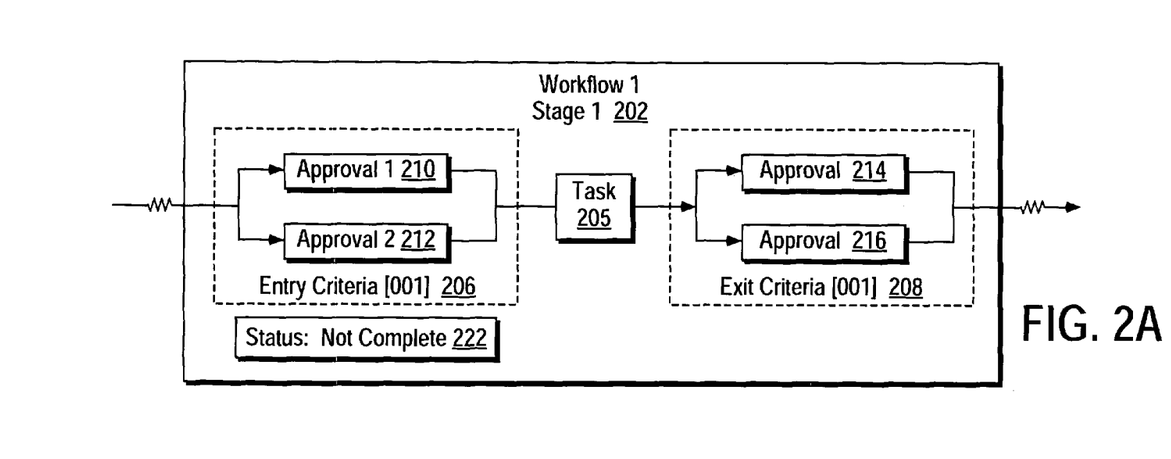
FIGS. 2A-B are separate diagrammatic views individual steps of a workflow system according to the invention.

The system 100 further includes global administration module 108. According to the invention, the global administration module is configured to enable changes in individual steps that are located within multiple workflows. For example, referring to FIGS. 2A and 2B, an example of a change in a workflow step is illustrated. The first step 202 in FIG. 2A is shown as modified step 204 in FIG. 2B. In FIG. 2A, workflow 1, stage 1, 202, includes a task 205 to be performed, such as a product assembly or shipping task, a service or project task, or other task that requires workflow management. The step is further shown having entry criteria [001] 206 and exit criteria [001] 208. Entry criteria 206 further includes an approval algorithm that includes approvals 210, 212, that defines the approvals required before entering into the task 205.

In one embodiment, products belonging to different product lines can follow the same workflow, but going through different sets of exit criteria. For example, if a product has different component parts and assemblies, it may have different quality control criteria. The production of the product, however, may go through the same incremental steps of a workflow. The difference would be in the different exit criteria for each component. In operation, a system configured according to the invention would allow the merging of multiple workflows into one for purposes of managing and monitoring them in one workflow. Using conventional systems, multiple separate workflows would need to be created for each component part that required different exit criteria. According to the invention, such a workflow could be managed and maintained in a single manageable workflow.

Figure 2B:
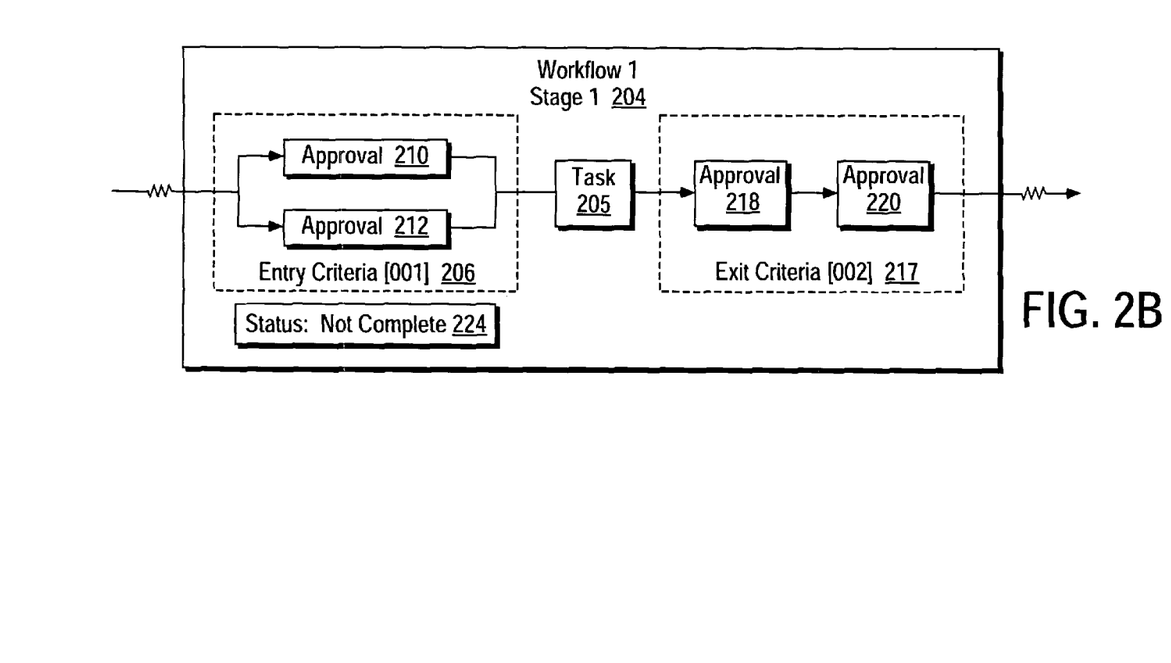

Similarly, the exit criteria 208 include approvals 214, 216, that define the approvals necessary to exit the workflow stage 202. In this configuration, the approvals in both the entry criteria and exit criteria allow for either of the approvals to allow entrance or exit from the workflow stage 202. Referring to FIG. 2B, the modified stage 204 is illustrated, where the basic criteria 217 have been modified from criteria 208. The exit criteria 217 include approvals 218, 220, which now are shown in a series. Therefore, the exit criteria [002] its 217 require both approvals 218, 220 exiting from stage 202. The stages also include status criteria 222, 224, that indicate whether or not the stage has been completed.

Unlike the prior art, this allows the system 100 to operate on global level, where centralized administration of certain steps is possible. For example, within the system 100, many steps may exist that may have universal application in different workflows. The administration of such steps may also have universal relevancy among the different workflows. According to the invention, steps existing within the various workflows that have common criteria may be administered on a global scale, providing many benefits to a business or group implementing the system. One of these benefits is uniformity of administration. In such a system, uniformity and consistency in administering different workflows may be critical to a system's operation. This also greatly simplifies the administration of the system in general. In one embodiment of the invention, the criteria may be reusable in multiple stages in the workflow. Certain criteria may be defined and used in multiple locations. This way, since the multiple exit criteria will be satisfied upon the same conditions, workflows may operate in a uniform manner. Yet another benefit is centralization of the administration, providing accountability and central control of workflows from a global standpoint. In one embodiment, authority privileges of local administration modules are dominant to global administration modules. This may occur in an application where the local administrators are given superior authority because they are close to the process. In other embodiments, global authority may be dominant, or authority may be mixed for different types of steps. Which configuration is used may depend on the particular application.

Figure 3:
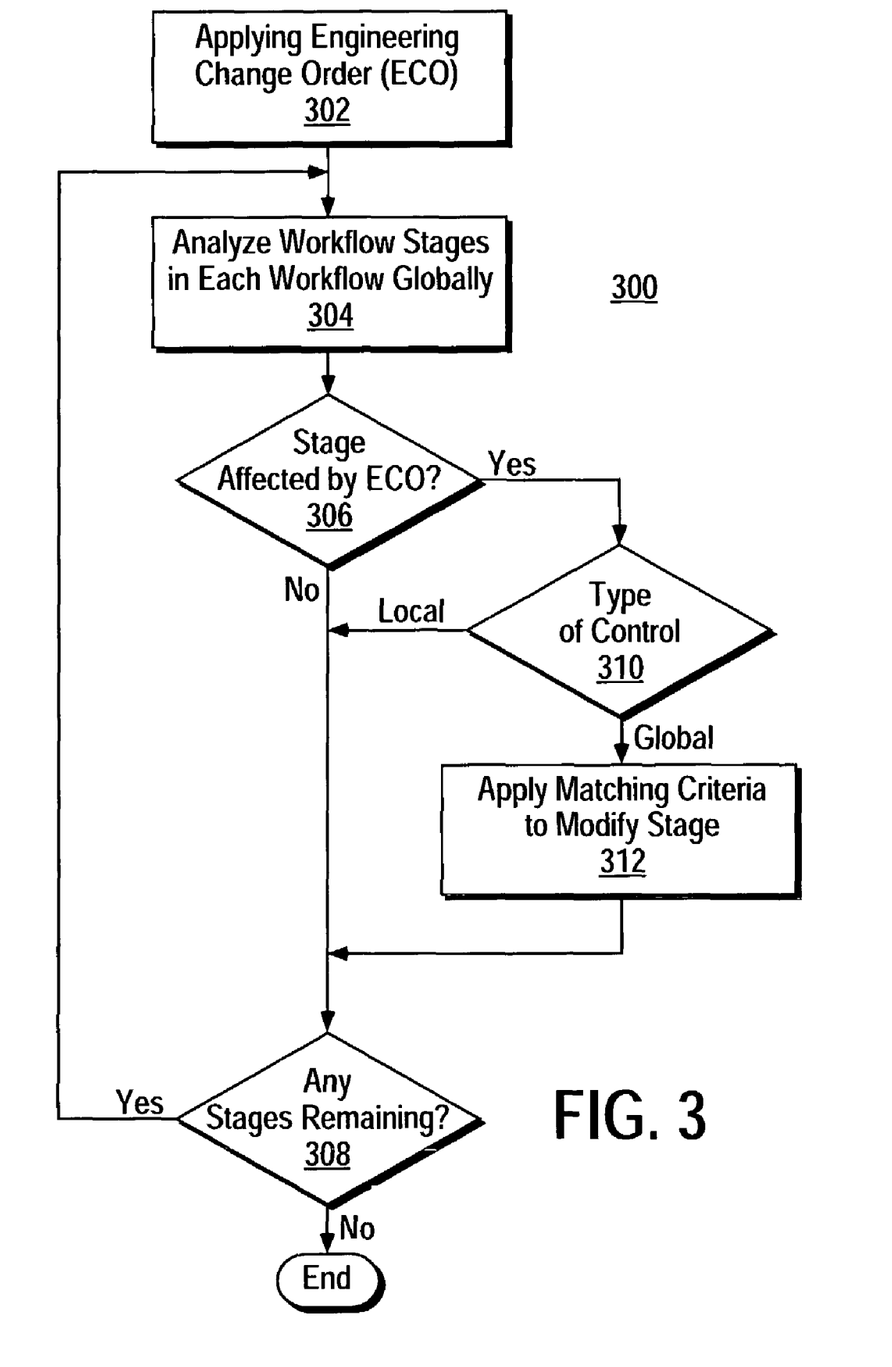
FIG. 3 is a flow diagram illustrating the application of an ECO according to the invention.

In one embodiment of the invention, a method is provided for globally controlling the individual steps and multiple workflows by storing them in a database. This acts to centralize the criteria of individual steps. The system can provide local linked applications for each workflow. These applications can be configured to perform database searches in order to retrieve criteria for the individual workflows. As discussed, depending on how the global and local authority privileges are configured, either local administration modules or global administration modules may dominate in final decisions of criteria changes. The global administration module may operate to perform application server searches which in turn communicates with the database, in order to locate and modify the steps having to the affected criteria. For example, certain steps may affect particular products. The steps may have common criteria that are universally administered from a global point of view. Such steps could have tags or other identifying attributes that may easily be detected and found by a conventional database search. The global administration module may then affect changes in steps that have universal application. Referring to FIG. 3, one such method 300 is illustrated.

In one example of a change, Step 302 illustrates an application of an engineering change order (ECO). In one embodiment, the ECO is in the form of a database query. The query is a search for attributes in the database. The attributes may represent criteria identified with objects representing the workflow process steps. They may also represent products or components that may be affected by the proposed change of the ECO. In Step 304, the global administration module analyzes workflow stages or steps in each workflow globally. In this step, the common attributes identified by the ECO are searched out and located. For example, in a database implementation, a database search is performed to locate objects having the attributes identified in the ECO. The Change Analyst then decides upon the workflow this ECO would follow. This is determined by the matching criteria of the workflow. Similar to the exit criteria, the matching criteria also provides the same facility of "same", "some", "all" options for the criteria should the criteria involve affected items as part of the searchable attributes in the criteria.

In Step 306, a stage is analyzed to determine whether there is a match. If there is no match, i.e. it is determined that it is not affected by the ECO, the process proceeds to Step 308 to determine whether any stages in the system remain to be analyzed, i.e. whether any other objects exist having the common attributes identified in the ECO. If there are no further stages analyze, then the process ends. If, however, further stages remain, the process proceeds back to Step 304 where the workflow stages are further analyzed. Referring back to Step 306, if in fact a stage is found to be affected by the ECO, the process proceeds to Step 310 were it is determined which type of control the stage is governed by. If the stage is governed solely by a local administration module, then the global administration module would not effect changes to the stage, and the process proceeds to Step 308. If, however, a stage is detected that is affected by the ECO, and is governed by the global administration module, then the process proceeds to Step 312 where matching criteria processes are used modify the stage. The criteria list is initially built by loading from the database, but every time whether an object matches the criteria or not, is computed in memory by the application server. This process determines whether or not the change indicated by the ECO is applicable to the stage under analysis. The changes are then applied to the stage.

Figure 4:
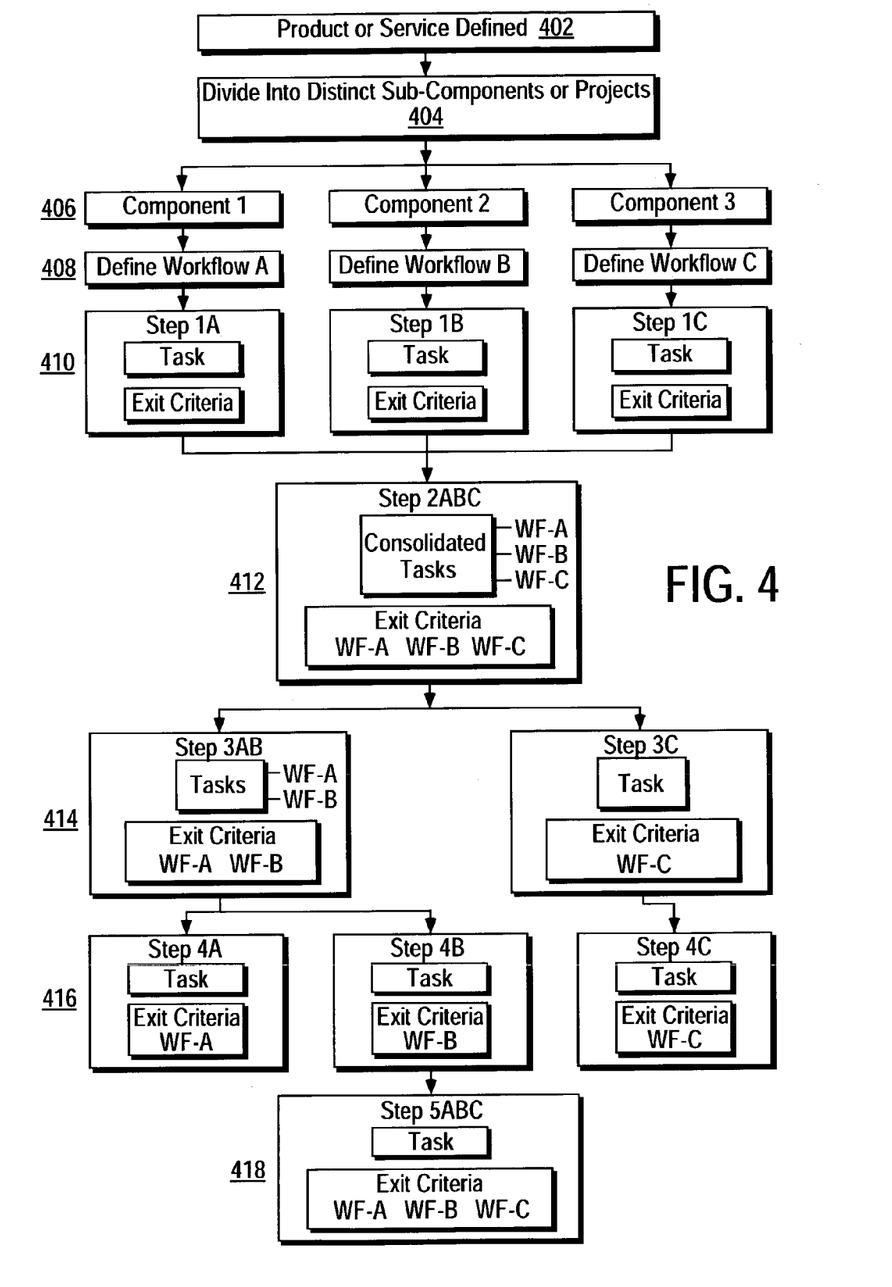
FIG. 4 is a diagrammatic view of a workflow configured according to the invention.

Referring to FIG. 4, an illustration of a workflow system is shown, where application of the invention proves to consolidate stages existing in multiple workflows. The embodiment of FIG. 4 illustrates a workflow diagram that illustrates a workflow system from a functional view. The system operates in a logical structure where exit criteria exist at each step and no entry criteria exists. Therefore, when the exit criteria are met, the process proceeds to the subsequent step according to the workflow. In Step 402, the product or service to be adapted to the workflow is defined. In Step 404, the product or service is divided into distinct sub-components or projects that can be categorized in separate workflows. In Step 406, each of the components is defined. In Step 408, each of their respective workflows, workflow A, workflow B and workflow C is defined. In Step 410, the first stages, Steps 1A, 1B and 1C respectively are defined with a task and exit criteria. This defines the initial step of each of individual workflows, each of which, according to the invention, would be governed by a local administration module in order to define the exit criteria and other attributes of the stages. In Step 412, according to the invention, in this step 2ABC, the tasks to the may be consolidated into a single task, or may be simply consolidated for administration of the exit criteria. This step governs the workflow for this particular Step, but for each individual workflow A, B and C respectively. Utilizing a system in practical applications, it has been shown to eliminate entire workflows by consolidating the exit criteria and centralizing the control of individual steps.

Still referring to FIG. 4, in Step 414, two of the three steps have been consolidated, giving Step 3-AB. In this step, the tasks of workflow A and workflow B for this particular step may or may not be consolidated, and the exit criteria are consolidated for each of the workflows. In contrast, Step 3C operates separately within workflow C, with its own workflow task and exit criteria. In Step 416, each of the individual steps, Steps 4A, 4B and 4C, operate independently with their own tasks and exit criteria. In the final step, Step 418, the workflow step 5ABC is consolidated again, similar to Step 412, wherein the exit criteria for the different workflows are consolidated. As can be seen, the consolidation of the administration of different steps across various workflows can simplify a multitude of workflows by consolidating their steps. The steps may be consolidated according to consolidated tasks, and they may be consolidated according to the exit criteria for each of the individual tasks performed for each workflow. In many applications, although the tasks are different and separate, the exit criteria, i.e. approvals required to deem a task completed, may be equivalent, whereby criteria for approving the task completion may be the same.

Figure 5:
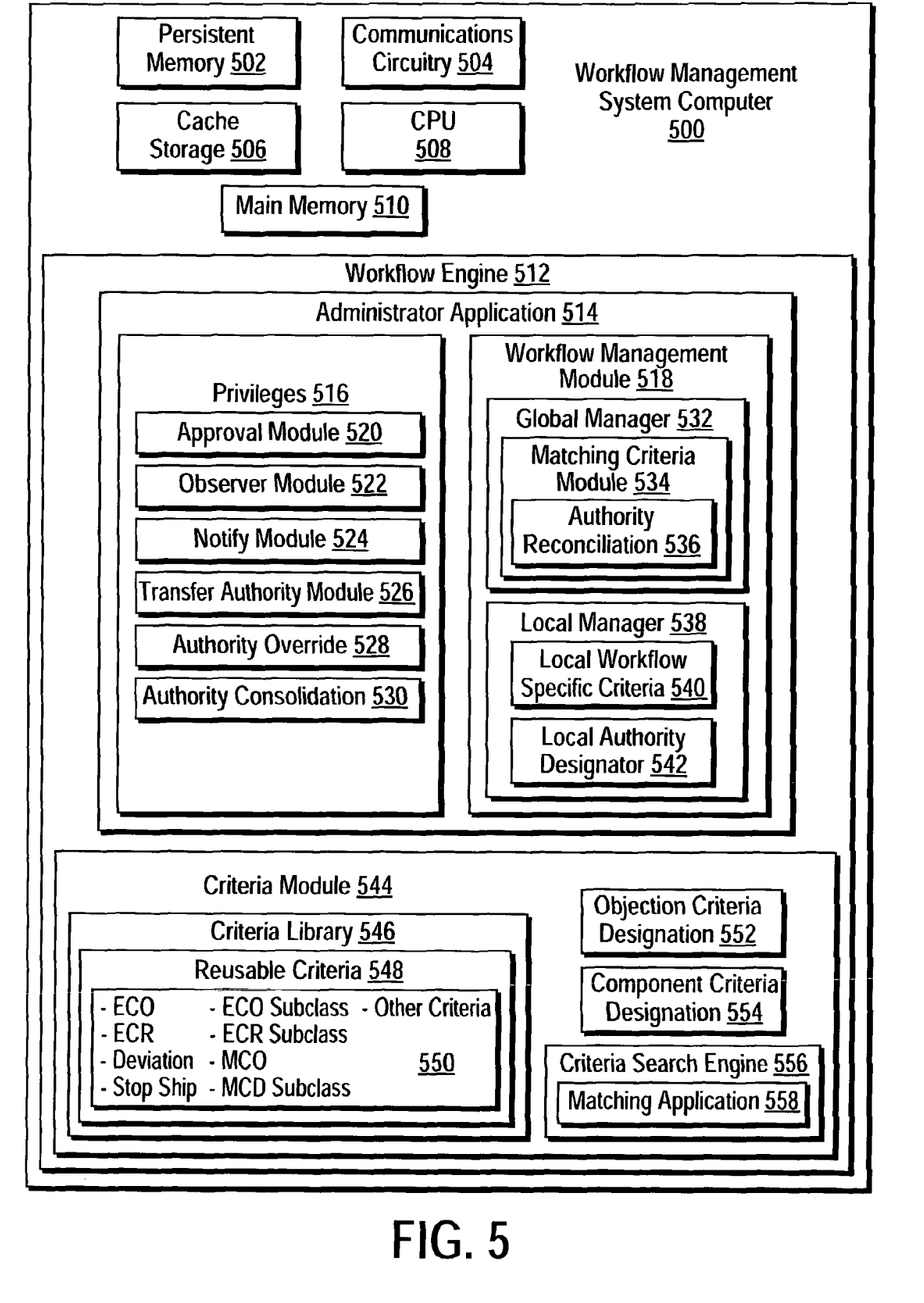
FIG. 5 is a diagrammatic view of a workflow management system computer according to the invention.

Referring to FIG. 5, an example of a workflow management system computer 500 is illustrated. The workflow management system may be located in a central server connected to a database for efficient management of the database. In other embodiments, the workflow management system may be a distributed system, where the different administration (local, global or otherwise) may be distributed among different entities or different users. In one embodiment, the workflow management system is software program code that is executable by a computer system configured to run programs and accomplish certain tasks related to the management and implementation of workflows. The system 500, includes a persistent memory 502 configured to store frequently used information. The system may also included communication circuitry 504 configured to communicate with other computers and devices that may be connected via a network, wireless systems or other types of communication systems. The system may also include cache storage 506 for storing information that is frequently used by the CPU 508, and for loading information from the main memory 510 for faster and efficient access by the CPU.

The main memory 510 includes a workflow engine 512 containing software code, programs and algorithms necessary for managing workflow. The administrator application 514 is configured to manage the workflows according to establish privileges module 516 and the workflow management module 518. Privileges module 516 contains various code algorithms for governing the different privileges for effecting workflow administration. Approval module 520 is configured to establish privileges for different types of approvals required to enter and exit different workflow stages. For example, the approval module may include various exit criteria algorithms such as those illustrated in FIGS. 6A, 6B and 6C.

Figure 6A:
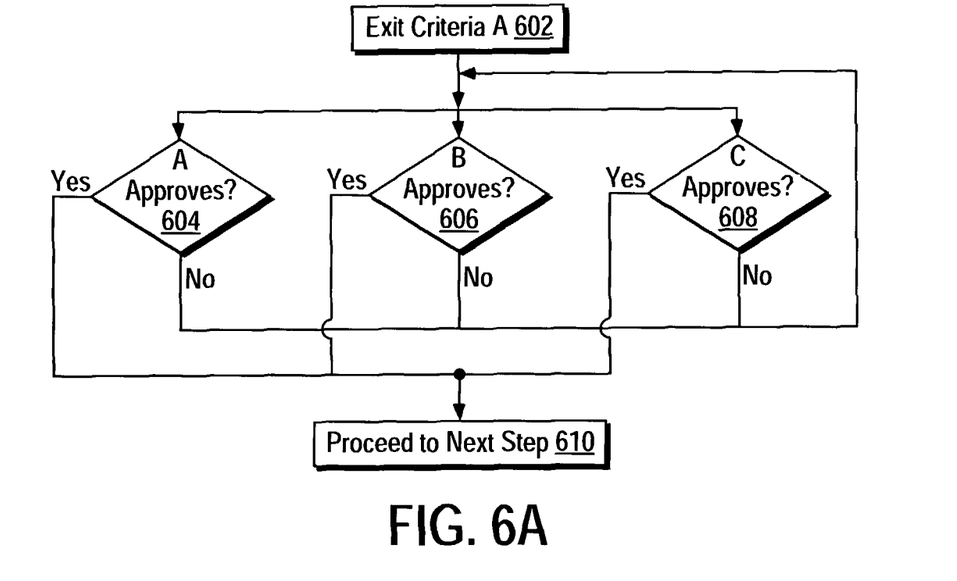
FIGS. 6A, 6B and 6C are flow diagrams of various exit criteria according to the invention.

In FIG. 6A, exit criteria A is illustrated, whereby any one approval allows procession to a subsequent Step. In Step 604, if A approves, then the process proceeds to the next step. Similarly, if B or C approves in Steps 606 and 608 respectively, then the process proceeds to the next step 610. If, however, all approvers do not approve of the procession, the process returns back to the approval steps, 604, 606 and 608, until one approves.

Figure 6B:
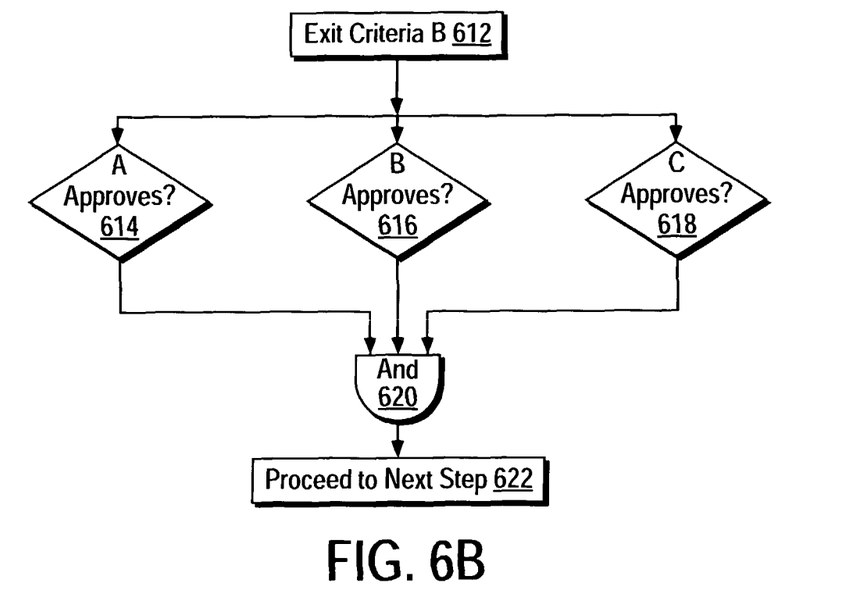

Referring to FIG. 6B, exit criteria B 612 is illustrated. In this algorithm, all of the approvers, A (614), B (616) and C (618), must approve, indicated by the AND gate 620, before the process proceeds to the following Step 622. If neither of the approvers approve, the process returns back to the approval steps 604, 606, and 608.

Figure 6C:
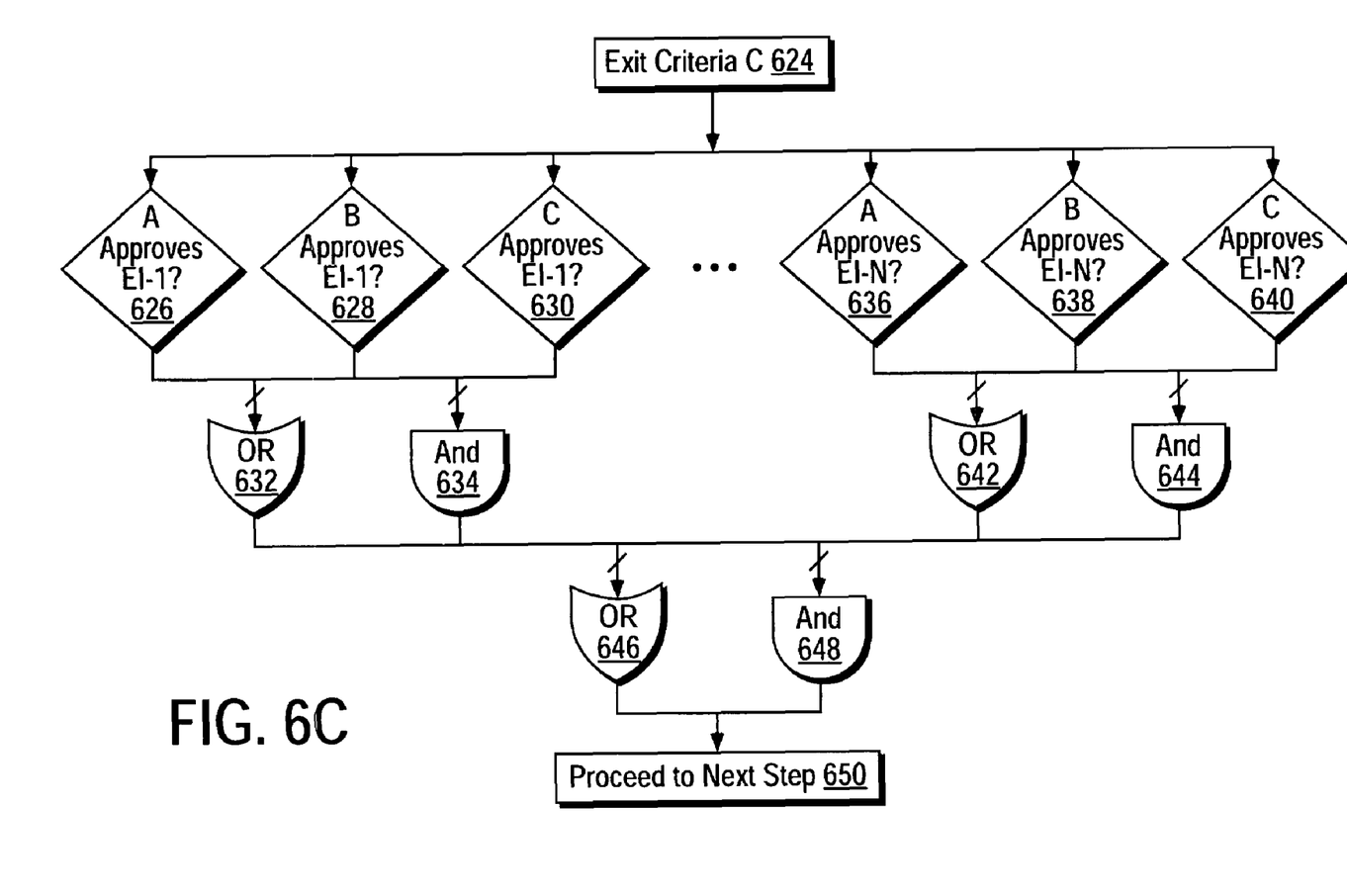

Referring to FIG. 6C, yet another variation of the approval algorithm is illustrated. This algorithm, exit criteria C, is more flexible for providing a variety of different exit criteria for stages. Different sets of approvers, A, B and C respectively, may be designated for procession to subsequent steps. Exit indicia (EI) indicate these different groups. The initial group of approvers, 626, 628 and 630, are connected to OR gate 632 and AND gate 634, either of which may be designated as the criteria logic for procession to a subsequent step. Similar configurations may be established as possibly redundant approvers 636, 638 and 640, with respective OR 642 and AND 644 gates respectively. These separate systems may be joined by second stage OR gate 646 and AND gate 648 respectively, for governing whether a stage proceeds to the next step at step 650. Such a configuration is programmable, allowing an administrator to establish different approval criteria among various groups. Such a flexible system can be highly functional in a system where alternate approver's are desired.

Referring again to FIG. 5, observer module 522 may be configured to establish which individuals, groups or entities may observe the progression of a particular workflow and possibly particular steps in particular workflow. Such observers would have access to the information pertaining to such workflows and stages. Notify module 524 is configured to notify particular observers or interested parties of the progression of a workflow or stage.

Transfer authority module 526 is configured to allow the transfer of certain privileges to other users or entities, where flexibility is desired in administering the exit criteria of a particular stage or set of universally applicable stages. The transfer authority module may be configured by a general Administrator, where local and global authorities may be administered.

Authority override module 528 is configured to override the authority of any particular stage, set of stages or workflows. Authority consolidation module 530 is configured to manage the authority for stage changes. This could apply to different approvers is in different stages and possibly in different workflows. Giving authority to the global administration module enables an administrator to globally effect changes according to the invention. This authority may be qualified according to the application. Such global changes can have universal effect on various workflows, allowing workflow stages to be consolidated, and workflows to be simplified.

Workflow management module 518 is configured to enable the global and local management of workflows. Workflow management module 518 includes a global manager 532 configured to effect global changes to universally applicable stages that have similar exit criteria. The global manager includes matching criteria module 534 configured to determine whether stages in various workflows have criteria that are adaptable to global changes. Utilizing the matching criteria module, the global manager can perform database searches to determine whether matching criteria exists in different stages and whether changes can be applied on global basis. Authority reconciliation module 536 is configured to reconcile any conflicts in authority that may exist as a result of such global assertion of changes. Local manager 538 is configured to establish the scope of changes that can be affected by a local Administrator. The local manager includes a local workflow specific criteria 540 that establish the entry and exit criteria that may exist on a local level for individual stages in a workflow. Local authority designator module 542 is configured to establish the authority for approving procession from one stage to another in workflows on a local level.

Criteria module 544 is included in workflow engine 512 to establish, catalog and organize the different types of criteria used on both a local and global basis. The criteria module includes a criteria library 546 that includes the different criteria that may be used in different workflow stages. Reusable criteria 548 include exit and entry criteria that may be universally applicable to stages that exist in various different workflows. Reusable criteria includes engineering change orders (ECOs), engineering change requests (ECRs), deviations, stop ship orders, management change orders (MCOs), sub-classes of different criteria and other criteria. MCOs are typically used specifically for redlining information pertinent to the manufacturers of the affected component or assembly. ECRs are usually merely treated as requests for change, but they may culminate into ECOs once they are approved. Object criteria designation module 552 is configured to designate criteria of their specific to objects within workflows. Criteria can be designated for particular objects and earmarked for universal application. For example, if an administrator desire to make a global change that affected criteria that are specific to particular objects, then object criteria designated by the object criteria designation module would be searched in the database by a workflow manager making the change. Similarly, component criteria designation module 554 is configured to designate criteria to particular components of a product or other business processes for global change. For example, if a workflow management module desires to make a global change according to particular components, the workflow management module is configured to perform database searches according to affected components, whether or not they exist in different stages or different workflows. These operations are performed by the criteria search engine 556 adding a matching application 558 for matching the criteria of different objects, components, or other entities stored in a database that are earmarked according to different attributes or criteria.

In general, embodiments of the invention may include the utilization of dedicated processors, webservers configured to receive and route communications among application servers, state servers and other types of computer processors configured to communicate amongst each other and that may be connected to one or more networks, including a Local Area Network (LAN), an intranet and the Internet. However, it will be appreciated by those skilled in the art, implementation of such devices and systems are but few illustrations of the utility of the invention, and that the invention may have greater applicability and utility in many other applications where efficient routing and processing of data related to workflows within one or more networks is involved. Equivalent structures embodying the invention could be configured for such applications without diverting from the spirit and scope of the invention. Although this embodiment is described and illustrated in the context of devices and systems for exchanging data among users of a computer system or network, the invention extends to other applications where similar features are useful. The invention may include personal computers, application servers, state servers or Internet webservers that are designed and implemented on a computer and may be connected to a network for communication with other computers to practice the invention. A system configured to operate according to the invention may include a plurality of personal computers connected to the Internet via individual modems or other communication means such as wireless communications.

If on a separate computer, it will be apparent that the client processor is conventional and that various modifications may be made to it. Data can be stored in the database, or may optionally be stored in data files, which gives a user an organized way to store data. The client processor may also include a conventional operating system, such as Windows, for receiving workflow information to monitor and manage.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers', such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for enabling and controlling workflow in conjunction with the operation of a software application. Although this embodiment is described and illustrated in the context of different embodiments, the scope of the invention extends to other applications where the management and monitoring of workflow is useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method comprising:

storing, by a computer system, a plurality of workflow steps in a database, each workflow step including an exit criterion representing a condition that must be satisfied before the workflow step can be exited and processing can proceed to a subsequent workflow step;

receiving, by the computer system, information specifying an attribute and a global modification to be made to all workflow steps associated with the attribute;

storing, by the computer system, a library of reusable exit criteria, wherein the reusable exit criteria are applicable to a plurality of distinct workflows, and wherein the global modification indicates that the exit criteria for workflow steps associated with the attribute should be replaced by a reusable exit criterion in the library;

identifying, by the computer system, a first workflow step and a second workflow step in the database that is associated with the attribute, wherein the first workflow step is part of a first workflow, wherein the second workflow step is part of a second workflow, and wherein the first workflow and the second workflow are distinct;

determining, by the computer system, if the first workflow step and the second workflow step are associated with a global administration privilege indicating that they can be modified by the global modification, or with a local administration privilege indicating that they can only be modified by a local modification that solely affects their respective workflows;

if the first workflow step and the second workflow step are associated with the global administration privilege, modifying, by the computer system, the exit criterion included in the first workflow step and the exit criterion included in the second workflow step based on the global modification; and if the first workflow step and the second workflow step are associated with the local administration privilege, preventing, by the computer system, any modification of the first workflow step or the second workflow step based on the global modification.

2. The method of claim 1 wherein each workflow step in the plurality of workflow steps also includes an entry criterion representing a condition that must be satisfied before the workflow step can be started, and wherein if the first workflow step and the second workflow step are associated with the global administration privilege, the entry criterion included in the first workflow step and the entry criterion included in the second workflow step are modified based on the global modification.

3. The method of claim 1 wherein the first workflow pertains to a process for manufacturing a first component of a product, wherein the second workflow pertains to a process for manufacturing a second component of a product, and wherein the information specifying the attribute and the global modification is based on an engineering change order for the product.

4. The method of claim 1 wherein the exit criterion for the first workflow step and the exit criterion for the second workflow step are identical.

5. A tangible machine-readable storage medium having stored thereon program code executable by a computer system, the program code comprising:

code that causes the computer system to store a plurality of workflow steps in a database, each workflow step including an exit criterion representing a condition that must be satisfied before the workflow step can be exited and processing can proceed to a subsequent workflow step;

code that causes the computer system to receive information specifying an attribute and a global modification to be made to all workflow steps associated with the attribute;

code that causes the computer system to store a library of reusable exit criteria, wherein the reusable exit criteria are applicable to a plurality of distinct workflows, and wherein the global modification indicates that the exit criteria for workflow steps associated with the attribute should be replaced by a reusable exit criterion in the library;

code that causes the computer system to identify a first workflow step and a second workflow step in the database that is associated with the attribute, wherein the first workflow step is part of a first workflow, wherein the second workflow step is part of a second workflow, and wherein the first workflow and the second workflow are distinct;

code that causes the computer system to determine if the first workflow step and the second workflow step are associated with a global administration privilege indicating that they can be modified by the global modification, or with a local administration privilege indicating that they can only be modified by a local modification that solely affects their respective workflows;

code that, if the first workflow step and the second workflow step are associated with the global administration privilege, causes the computer system to modify the exit criterion included in the first workflow step and the exit criterion included in the second workflow step based on the global modification; and code that, if the first workflow step and the second workflow step are associated with the local administration privilege, causes the computer system to prevent any modification of the first workflow step or the second workflow step based on the global modification.

6. The tangible machine-readable storage medium of claim 5 wherein each workflow step in the plurality of workflow steps also includes an entry criterion representing a condition that must be satisfied before the workflow step can be started, and
   wherein if the first workflow step and the second workflow step are associated with the global administration privilege, the entry criterion included in the first workflow step and the entry criterion included in the second workflow step are modified based on the global modification.

7. The tangible machine-readable storage medium of claim 5 wherein the first workflow pertains to a process for manufacturing a first component of a product, wherein the second workflow pertains to a process for manufacturing a second component of a product, and wherein the information specifying the attribute and the global modification is based on an engineering change order for the product.

8. The tangible machine-readable storage medium of claim 5 wherein the exit criterion for the first workflow step and the exit criterion for the second workflow step are identical.

9. A system comprising:
   a storage component configured to store a plurality of workflow steps, each workflow step including an exit criterion representing a condition that must be satisfied before the workflow step can be exited and processing can proceed to a subsequent workflow step; and
   a processor in communication with the storage component, the processor being configured to:
     receive information specifying an attribute and a global modification to be made to all workflow steps associated with the attribute;
     store a library of reusable exit criteria, wherein the reusable exit criteria are applicable to a plurality of distinct workflows, and wherein the global modification indicates that the exit criteria for workflow steps associated with the attribute should be replaced by a reusable exit criterion in the library;
     identify a first workflow step and a second workflow step in the database that is associated with the attribute, wherein the first workflow step is part of a first workflow, wherein the second workflow step is part of a second workflow, and wherein the first workflow and the second workflow are distinct;
     determine if the first workflow step and the second workflow step are associated with a global administration privilege indicating that they can be modified by the global modification, or with a local administration privilege indicating that they can only be modified by a local modification that solely affects their respective workflows;
     if the first workflow step and the second workflow step are associated with the global administration privilege, modify the exit criterion included in the first workflow step and the exit criterion included in the second workflow step based on the global modification; and
     if the first workflow step and the second workflow step are associated with the local administration privilege, prevent any modification of the first workflow step or the second workflow step based on the global modification.

10. The system of claim 9 wherein each workflow step in the plurality of workflow steps also includes an entry criterion representing a condition that must be satisfied before the workflow step can be started, and
    wherein if the first workflow step and the second workflow step are associated with the global administration privilege, the entry criterion included in the first workflow step and the entry criterion included in the second workflow step are modified based on the global modification.

11. The system of claim 9 wherein the first workflow pertains to a process for manufacturing a first component of a product, wherein the second workflow pertains to a process for manufacturing a second component of a product, and wherein the information specifying the attribute and the global modification is based on an engineering change order for the product.

12. The system of claim 9 wherein the exit criterion for the first workflow step and the exit criterion for the second workflow step are identical.

* * * * *